(12) United States Patent
Sun

(10) Patent No.: US 9,316,868 B2
(45) Date of Patent: Apr. 19, 2016

(54) LIQUID CRYSTAL DISPLAY PANEL AND METHOD FOR FABRICATING THE SAME

(71) Applicant: BOE TECHNOLOGY GROUP CO., LTD., Beijing (CN)

(72) Inventor: Tao Sun, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 14 days.

(21) Appl. No.: 14/360,183

(22) PCT Filed: Apr. 22, 2013

(86) PCT No.: PCT/CN2013/074488
§ 371 (c)(1),
(2) Date: May 22, 2014

(87) PCT Pub. No.: WO2013/131233
PCT Pub. Date: Sep. 4, 2014

(65) Prior Publication Data
US 2015/0346555 A1  Dec. 3, 2015

(30) Foreign Application Priority Data

Feb. 28, 2013  (CN) .......................... 2013 1 0064100

(51) Int. Cl.
G02F 1/1335 (2006.01)
G02F 1/1337 (2006.01)
G02F 1/139 (2006.01)

(52) U.S. Cl.
CPC ........ *G02F 1/133707* (2013.01); *G02F 1/1395* (2013.01); *G02F 1/133512* (2013.01); *G02F 1/133514* (2013.01); *G02F 1/133516* (2013.01)

(58) Field of Classification Search
CPC .................. G02F 2001/133776; G02F 1/1337; G02F 1/133707; G02F 1/133512; G02F 1/133514; G02F 1/133516; G02F 1/1395
USPC ................................................. 349/129–130
See application file for complete search history.

(56) References Cited

U.S. PATENT DOCUMENTS

| 6,693,693 | B1 | 2/2004 | Okita et al. | |
| 2001/0020992 | A1* | 9/2001 | Takeda | G02F 1/1393 349/130 |

(Continued)

FOREIGN PATENT DOCUMENTS

| CN | 1363852 A | 8/2002 |
| CN | 1469162 A | 1/2004 |

(Continued)

OTHER PUBLICATIONS

Second Chinese Office Action of Chinese Application No. 201310064100.6, mailed May 18, 2015 with English translation.
Chinese Office Action of Chinese Application No. 201310064100.6 with English translation, mailed Dec. 3, 2014.

(Continued)

*Primary Examiner* — James Dudek
(74) *Attorney, Agent, or Firm* — Collard & Roe, P.C.

(57) ABSTRACT

A liquid crystal display panel and a method for fabricating the same are disclosed. The liquid crystal panel comprises a first substrate (1), a second substrate (2) and a liquid crystal layer (3) sandwiched between the first substrate (1) and the second substrate (1), wherein protrusions (4) are respectively disposed on a side of the first substrate (1) adjacent to the liquid crystal layer (3) and a side of the second substrate (2) adjacent to the liquid crystal layer (3).

17 Claims, 2 Drawing Sheets

(56) References Cited

U.S. PATENT DOCUMENTS

2003/0123004 A1    7/2003    Fujii et al.
2006/0139539 A1*  6/2006    Chen .................. G02F 1/13363
                                                            349/129

FOREIGN PATENT DOCUMENTS

| | | |
|---|---|---|
| CN | 1540412 A | 10/2004 |
| CN | 1554972 A | 12/2004 |
| CN | 101699335 A | 4/2010 |

OTHER PUBLICATIONS

English Translation of the International Search Report of PCT/CN2013/074488, mailed Dec. 19, 2013.

International Search Report, International Preliminary Report on Patentability and Written Opinion of the International Searching Authority of PCT/CN2013/074488. in Chinese, mailed Dec. 19, 2013.

English translation of International Preliminary Report on Patentability and Written Opinion of the International Searching Authority of PCT/CN2013/074488 issued Sep. 1, 2015.

* cited by examiner

LIQUID CRYSTAL DISPLAY PANEL AND METHOD FOR FABRICATING THE SAME

CROSS REFERENCE TO RELATED APPLICATIONS

This application is the National Stage of PCT/CN2013/074488 filed on Apr. 22, 2013, which claims priority under 35 U.S.C. §119 of Chinese Application No. 201310064100.6 filed on Feb. 28, 2013, the disclosure of which is incorporated by reference.

FIELD OF THE ART

The disclosure relates to the field of liquid crystal display technologies, more particularly, to a liquid crystal display (LCD) panel adaptable to the optical compensated bend (OCB) mode and a method for fabricating the same.

BACKGROUND

In a known OCB mode, phase difference between long axes of liquid crystal molecules at surfaces of the upper and lower substrates is 180°. The liquid crystal molecules are in a splay state when no external voltage is supplied. When the external voltage is supplied, the liquid crystal molecules becomes in a bend state, in this case, the liquid crystal molecules closest to the upper and lower glass substrates are oriented substantially parallel to the substrates, while the liquid crystal molecules in the middle portion of a gap between the upper and lower glass substrates are perpendicular to the upper and lower substrates all the time. The other liquid crystal molecules are bent, but not twisted, in a plane. As the liquid crystal molecules in upper and lower portions are symmetrical to each other in bend state, influence on the optical performance caused by the oblique liquid crystal molecules is overcome, the liquid crystal molecules between the upper and lower substrates compensate for each other, thereby achieving a symmetrical wide viewing angle.

As illustrated in FIG. 1, as liquid crystal molecules 31 in OCB mode are rotated in only one plane, liquid crystal directors in the upper and lower portions are deflected in the same direction under the action of an electric field (E-field). By this means, backflow effect when adjusting the orientations of the liquid crystal molecules is avoided, thereby significantly improving the response speed of the liquid crystals.

However, nucleation is required when the OCB liquid crystal molecules switch from the splay state "b" to the bend state "a". When a voltage is applied, some liquid crystal molecules first switch to the bend state and become transition nucleuses in the liquid crystal cell, and other liquid crystal molecules will gradually switch to the bend state by following the transition nucleuses. The bend plane extends bit by bit until all the liquid crystal molecules switch to the bend state, which takes a long time. In the case that the transition nucleuses are not formed, it is possible that the liquid crystal molecules will not switch to the bend state. Moreover, if the external voltage is smaller than a critical voltage, the liquid crystal molecules will still not stable after switching to the bend state and the liquid crystal molecules will switch back to the splay state instantly.

It is seen from the above that a large voltage (about 20V) or a long time is required to finish the transition from the splay state to the bend state.

There is currently some research on this issue. As an example, nucleation agents or symmetrical chiral molecules are mixed in the liquid crystal molecules. The molecules are in twist state when no voltage is applied. It takes a smaller amount of energy to switch from twist state to the bend state than from the splay state to the bend state, making the transition easier. Some research adds macromolecule polymer to the liquid crystal molecules; the macromolecule polymer is photosensitive and can polymerize the molecules when being irradiated. The liquid molecules in irradiated portion will be arranged in bend state and becomes the bend nucleuses.

However, the above researches require new liquid crystal materials developed and suitable photosensitive polymer found, making the development cost high.

SUMMARY

An objective of the disclosure is to provide a liquid crystal display panel and a method for fabricating the same, with an aim of shortening the time needed for switching from the splay state to the bend state and improving the stability of the bend state.

A first aspect of the disclosure provides a liquid crystal display panel, comprising a first substrate, a second substrate and a liquid crystal layer sandwiched between the first substrate and the second substrate, wherein protrusions are respectively disposed on a side of the first substrate adjacent to the liquid crystal layer and a side of the second substrate adjacent to the liquid crystal layer.

A second aspect of the invention provides a method for fabricating the above liquid crystal display panel, the method comprises the following steps:

forming protrusions on a first substrate and forming protrusions on a second substrate; and disposing the first substrate and the second substrate with their sides having the protrusions formed thereon face to face, and forming a liquid crystal layer between the first substrate and the second substrate.

The liquid crystal display panel and its fabrication method provided by the above technical solution dispose the protrusions functioning as an inducing medium for inducing state transition of the liquid crystal molecules on the substrates, thereby making the liquid crystal molecules around the protrusions become the nucleation centers of state transition of the liquid crystal molecules, which makes it easier for the liquid crystal molecules to nucleate, shortens the transition time from the splay state to the bend state, makes the bend state easily achievable, and enhances the stability of the bend state. The liquid crystal display panel is adaptable to the OCB mode; it has a special configuration and fast response and is especially suitable for display dynamic images.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiment 1

Figure 3:
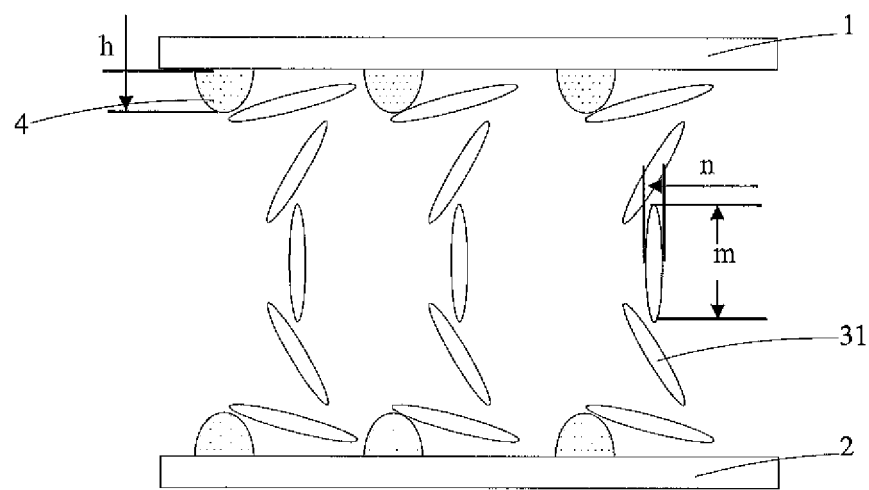
FIG. 3 schematically illustrates a configuration of a liquid crystal panel in accordance with an embodiment of the invention.

As illustrated in FIG. 3, a liquid crystal display panel of the embodiment comprises a first substrate 1, a second substrate 2 and a liquid crystal layer (liquid crystal molecules therein indicated by the numeral 31) sandwiched between the first substrate 1 and the second substrate 2, wherein protrusions 4 are respectively disposed on a side of the first substrate 1 adjacent to the liquid crystal layer and a side of the second substrate 2 adjacent to the liquid crystal layer.

As an example, the protrusions 4 of the first substrate 1 and the protrusions 4 of the second substrate 2 are disposed in mirror symmetry.

Figure 1:
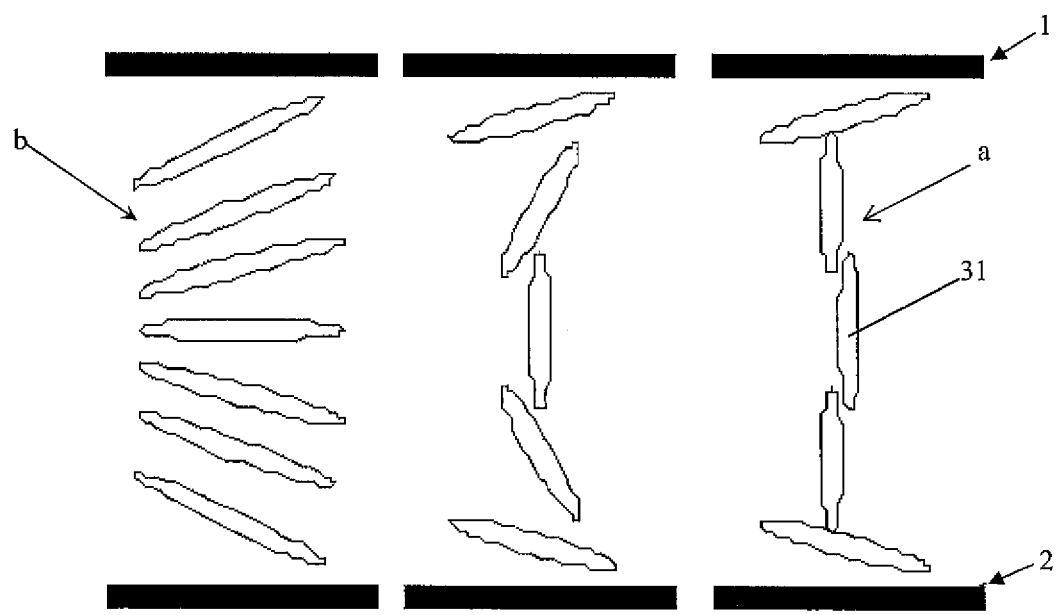
FIG. 1 schematically illustrates a configuration of state transition of liquid crystal molecules under know OCB mode.
Figure 2:
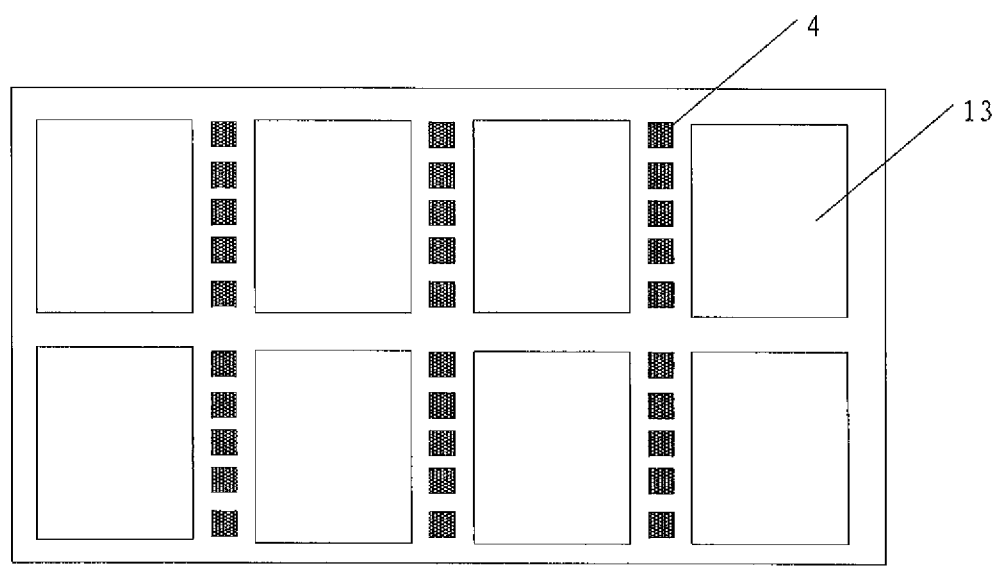
FIG. 2 schematically illustrates a plan view of a first substrate in accordance with an embodiment of the invention.
Figure 4:
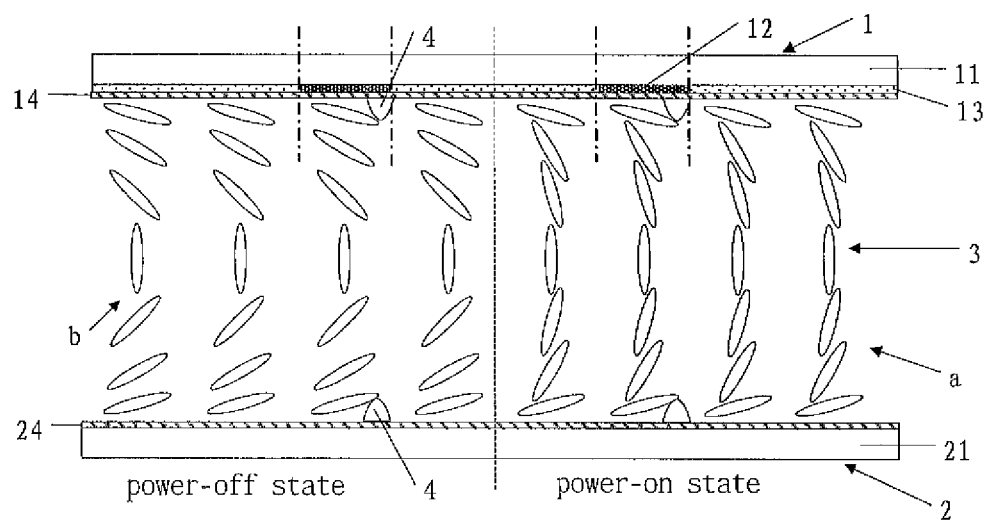
FIG. 4 schematically illustrates a configuration of state transition of liquid crystals in accordance with an embodiment of the invention.

As further illustrated in FIGS. 2 and 4, when the first substrate 1 is a color filter substrate, a surface layer of the color filter substrate comprises a first base substrate 11, a black matrix 12 and a color filter layer 13 disposed on the first base substrate 11, and an alignment film 14 of the first substrate; the second substrate 2 comprises a second base substrate 21 and an alignment film 24 of the second substrate. The protrusions 4 are disposed on the alignment film 14 of the first substrate and the alignment film 24 of the second substrate, that is, the alignment films 14, 24 are first formed on the first substrate 1 and the second substrate 2 respectively and then the protrusions 4 are formed on the alignment films 14, 24.

As an example, the protrusions 4 are disposed in a region corresponding to the black matrix of the color filter substrate (i.e. in a black matrix region) but not limited to the black matrix region. It may also be disposed in the color filter layer region, with the effect not as good as in the black matrix region. When the protrusions are disposed in the black matrix region, it may be made of the same material as the black matrix, such as an organic resin. When the protrusions are disposed in the color filter layer region, it is made of a transparent material, such as a transparent organic resin, such that the display effect is not affected. As an example, the protrusions 4 are arranged equidistantly on the first substrate or the second substrate. For example, as illustrated in FIG. 2, the protrusions 4 are arranged equidistantly and in respective vertical rows.

A width of the protrusions 4 is larger than a length "n" of the short axis of the liquid crystal molecules in the liquid crystal layer while smaller than a length "m" of the long axis of the liquid crystal molecules. Similarly, a height "h" of the protrusions 4 is larger than the length "n" of the short axis of the liquid crystal molecules in the liquid crystal layer while smaller than the length "m" of the long axis of the liquid crystal molecules, such that a size of the protrusions is equal to or smaller than that of the liquid crystal molecules, as protrusions with a larger size cannot induce the bend of the liquid crystal molecules. Herein, the length "n" of the short axis of the liquid crystal molecules is in a range from 3 nm to 8 nm; the length "m" of the long axis of the liquid crystal molecules is in a range from between 5 nm to 18 nm.

As an example, an upper portion of the protrusions 4 has a smooth surface, to ensure that the liquid crystal molecules will not be scraped off during the nucleation and to reduce the resistance to state transition of the liquid crystal molecules.

As an example, a width of the upper portion of the protrusions 4 is smaller than that of a lower portion. The protrusions have a shape similar to a cone, and a surface of the protrusions is a cambered surface. As illustrated in FIG. 3, a radius of the upper portion of the protrusions is smaller than that of the bottom portion such that a cambered surface is formed, which will facilitate the tilt of the liquid crystal molecules. The protrusions may also have the following shape: the lower portion has an arbitrary shape (can be rectangular as illustrated in FIG. 2), and the upper portion has a circular shape, and the cross section of the lower portion is larger than that of the upper portion. The purpose of such a configuration is to form an inclined surface which will facilitate the tilt of the liquid crystal molecules to make the nucleation easier. The protrusions 4 in FIG. 2 are formed in the black matrix region of the color filter substrate.

As an example, the upper portion of the protrusions has a hemisphere or hemisphere-like shape, the lower portion has a cylinder or cylinder-like shape, or has a quadrangular prism shape (such as rectangular parallelepiped). It is noted that the hemisphere-like shape refers to a convex arc similar to a hemisphere, while a cylinder-like shape refers to a structure similar to a cylinder, that is, a cylindrical body with an arbitrary curve-faced cross section. The shape of protrusions may also be any other arbitrary structure with an upper portion having a width smaller than that of the lower portion, to facilitate the tilt of the liquid crystal molecules. For example, the protrusions 4 may have a hemisphere or hemisphere-like shape as a whole.

The liquid crystal display panel of the above embodiment of the invention is adaptable to the OCB mode; it has a special structure and the advantage of fast response, and is especially suitable for displaying dynamic images. By disposing the protrusions functioning as an inducing medium for inducing state transition of the liquid crystal molecules on the substrates, it makes the liquid crystal molecules around the protrusions become the nucleation centers of the state transition of the liquid crystal molecules, which facilitates the nucleation of the liquid crystal molecules, thereby shortening the transition time from the splay state to the bent state, making the bend state easily achieved and the stability of the bend state enhanced.

Embodiment 2

The embodiment provides a method for fabricating the liquid crystal display panel of Embodiment 1. The method comprises the following steps:

S1, forming protrusions on a first substrate, and forming protrusions on a second substrate in mirror symmetry with those on the first substrate;

S2, disposing the first substrate and the second substrate with sides having the protrusions formed thereon opposite each other, and finally forming a liquid crystal layer between the first substrate and the second substrate.

As an example, the protrusions on the first substrate and the second substrate are formed through a patterning process.

As an example, the patterning process is a photolithography process and comprises the following steps:

S1', coating a material for forming the protrusions on alignment films of the first substrate and the second substrate, the material for the protrusions is a resin material to facilitate photolithography molding;

S2', exposing and developing the first substrate and the second substrate having the material coated thereon by way of a mask to form the protrusions on the first substrate and the second substrate.

As an example, the first substrate 1 is a color filter substrate, which has a black matrix and a color filter layer disposed thereon, and an alignment film is formed on the black matrix and the color filter layer. In an example, the protrusions 4 are disposed in the black matrix region of the color filter substrate. The second substrate 2 is an array substrate, a gate electrode, a data line, a Thin Film Transistor (TFT), a pixel electrode may be formed on the second substrate 2, and an alignment film is formed at the end.

Specifically, as illustrated in FIG. 4, the protrusions 4 are formed on the alignment film layer 14 of the first substrate 1, and also in the black matrix region 12. Meanwhile, same protrusions 4 are formed on the second substrate 2 in mirror symmetry. The protrusions 4 are used as an inducing medium for inducing state transition of the liquid crystal molecules. When a voltage is applied, the liquid crystal molecules are therefore induced by the protrusions 4 and can easily switch to the bend state "a" to form the bend nucleuses. Other molecules will take advantage of the bend nucleuses and switch to the bend state "a" having a lower free energy. When the bend state of the liquid crystal molecules is stable, the OCB mode has smoothly and rapidly switched the liquid crystal molecules from the splay state "b" to the bend state "a" in a plane, thereby achieving fast response. In the end, after the process for forming the protrusions 4 is furnished, the first substrate and the second substrate are assembled to form a cell and the liquid crystal is filled therebetween. The filling of the liquid crystal may take place before or after the assembling of the substrates.

When a voltage is applied, the protrusions function as the inducing medium for inducing state transition of the liquid crystal molecules. The liquid crystal molecules tilt on the inclined surface of the protrusions and can easily get bent. Therefore, the protrusions 4 are used as a platform which facilitates the liquid crystal molecules to transit from the splay state "b" to the bend state "a" and form the bend nucleus. Other molecules will take advantage of the bend nucleuses and switch to the bend state "a" having a lower free energy, thereby realizing fast response.

Embodiment 3

The embodiment differs from Embodiment 2 in that the liquid crystal molecules with different pretilt angles are disposed on the first substrate and the second substrate. Specifically, the pretilt angle of the liquid crystal molecules close to a region having protrusions formed is set as being higher than the pretilt angle of the liquid crystal molecules in other region. The reason for such a setting is due to that the liquid crystal molecules having a higher pretilt angle can more easily form bend nucleuses than those having a lower pretilt angle.

In the embodiment, the bend nucleuses are formed by setting different pretilt angles on the substrates, making the state of the liquid crystal molecules close to the region having protrusions formed easily switched, which facilitate the transition from the splay state to the bend state and from the bend state to the splay state.

In the embodiment, the pritilt angle of the liquid crystal molecules close to the region having protrusions formed is set as being higher than the pretilt angle of the liquid crystal molecules in other region, which makes the liquid crystal molecules in the region having the protrusions formed function as the nucleation centers of state transition of the liquid crystal molecules and the nucleation of the liquid crystal molecules easier. It can thus shorten the time from the splay state to the bend state and the bend state is easily achieved, and the stability of the bend state can be enhanced.

What are described above is related to the illustrative embodiments of the disclosure only and not limitative to the scope of the disclosure; the scopes of the disclosure are defined by the accompanying claims.

What is claimed is:

1. A liquid crystal display panel, comprising;
   a first substrate having an alignment film,
   a second substrate having an alignment film; and
   a liquid crystal layer sandwiched between the first substrate and the second substrate, wherein protrusions are respectively disposed on a side of the first substrate adjacent to the liquid crystal layer and a side of the second substrate adjacent to the liquid crystal layer, wherein the protrusions are disposed on said alignment film of the first substrate and said alignment film of the second substrate.

2. The liquid crystal display of claim 1, wherein the protrusions of the first substrate and the protrusions of the second substrate are disposed in mirror symmetry.

3. The liquid crystal display of claim 1, wherein the first substrate is a color filter substrate with a black matrix and a color filter layer disposed thereon, the protrusions are disposed in a region corresponding to the black matrix of the color filter substrate.

4. The liquid crystal display of claim 1, wherein a width of the protrusion is larger than a length of a short axis of the liquid crystal molecules in the liquid crystal layer and smaller than a length of a long axis of the liquid crystal molecules.

5. The liquid crystal display of claim 1, wherein a height of the protrusion is larger than the length of the short axis of the liquid crystal molecules in the liquid crystal layer and smaller than a length of a long axis of the liquid crystal molecules.

6. The liquid crystal display of claim 1, wherein an upper portion of the protrusions has a smooth surface.

7. The liquid crystal display of claim 6, wherein a width of the upper portion of the protrusions is smaller than that of a lower portion of the protrusions.

8. The liquid crystal display of claim 7, wherein the upper portion of the protrusion has a hemisphere or a hemisphere-like shape, the lower portion of the protrusion has a cylinder, or a cylinder-like, or a quadrangular prism shape.

9. A method for fabricating a liquid crystal display panel, the liquid crystal display panel comprising a first substrate having an alignment film, a second substrate having an alignment film and a liquid crystal layer sandwiched between the first substrate and the second substrate, wherein protrusions are respectively disposed on a side of the first substrate adjacent to the liquid crystal layer and a side of the second substrate adjacent to the liquid crystal layer, wherein the protrusions are disposed on said alignment film of the first substrate and said alignment film of the second substrate, the method comprising the following steps: forming protrusions on a first substrate and forming protrusions on a second substrate;

disposing the first substrate and the second substrate with their sides having the protrusions formed thereon face to face, and forming a liquid crystal layer between the first substrate and the second substrate;

providing a patterning process to form the protrusions on the first substrate and the second substrate;

wherein the patterning process is a photolithography process and comprises: coating a material for forming the protrusions on alignment films of the first substrate and the second substrate; and exposing and developing the first substrate and the second substrate both having the material coated thereon by way of a mask to form the protrusions.

10. The method of claim 9, wherein a pretilt angle of the liquid crystal molecules in the liquid crystal layer close to the protrusions is higher than that of the liquid crystal molecules in other region.

11. The method of claim 9, wherein the protrusions of the first substrate and the protrusions of the second substrate are disposed in mirror symmetry.

12. The method of claim 9, wherein the first substrate is a color filter substrate with a black matrix and a color filter layer disposed thereon, the protrusion is disposed in a region corresponding to the black matrix of the color filter substrate.

13. The method of claim 9, wherein a width of the protrusions is larger than a length of a short axis of the liquid crystal molecules in the liquid crystal layer and smaller than a length of a long axis of the liquid crystal molecules.

14. The method of claim 9, wherein a height of the protrusions is larger than the length of the short axis of the liquid crystal molecules in the liquid crystal layer and smaller than the length of the long axis of the liquid crystal molecules.

15. The method of claim 14, wherein an upper portion of the protrusions has a smooth surface.

16. The method of claim 15, wherein a width of the upper portion of the protrusions is smaller than that of a lower portion of the protrusions.

17. The method of claim 16, wherein the upper portion of the protrusion has a hemisphere or a hemisphere-like shape, the lower portion has a cylinder, or a cylinder-like, or a quadrangular prism shape.

\* \* \* \* \*